United States Patent
Omi

(10) Patent No.: US 8,169,207 B2
(45) Date of Patent: May 1, 2012

(54) POWER SUPPLY DEVICE INCLUDING A CLAMPING PORTION TO LIMIT AND ERROR VOLTAGE AND ELECTRONIC APPLIANCE PROVIDED THEREWITH

(75) Inventor: Masaki Omi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 887 days.

(21) Appl. No.: 12/185,909

(22) Filed: Aug. 5, 2008

(65) Prior Publication Data

US 2009/0039853 A1   Feb. 12, 2009

(30) Foreign Application Priority Data

Aug. 6, 2007   (JP) ................................ 2007-203851

(51) Int. Cl.
*G05F 1/40* (2006.01)
*H02M 1/00* (2007.01)

(52) U.S. Cl. ........ 323/285; 323/284; 323/901; 323/908; 363/49

(58) Field of Classification Search .................. 323/222, 323/225, 282, 284, 285, 901, 908; 363/49
See application file for complete search history.

(56) References Cited

U.S. PATENT DOCUMENTS

| | | | | |
|---|---|---|---|---|
| 4,806,842 A * | 2/1989 | Bittner | ......................... | 323/222 |
| 6,208,123 B1 * | 3/2001 | Sudo | ............................. | 323/280 |
| 7,002,330 B2 * | 2/2006 | Kitani et al. | .................. | 323/284 |
| 7,019,500 B2 * | 3/2006 | Chen | ............................. | 323/282 |
| 7,369,384 B2 * | 5/2008 | Inaba | ........................... | 361/91.1 |
| 7,619,397 B2 * | 11/2009 | Al-Shyoukh | ................. | 323/281 |
| 7,868,602 B2 * | 1/2011 | Omi et al. | ..................... | 323/284 |
| 2005/0275388 A1 * | 12/2005 | Takimoto et al. | ............. | 323/272 |
| 2009/0143032 A1 * | 6/2009 | Ojanen et al. | ............. | 455/127.1 |

FOREIGN PATENT DOCUMENTS

JP   07-336999   12/1995

* cited by examiner

*Primary Examiner* — Jessica Han
(74) *Attorney, Agent, or Firm* — Fish & Richardson P.C.

(57) ABSTRACT

A power supply device has an error amplifier producing an error voltage by amplifying a difference between a feedback voltage according to an output voltage and a predetermined reference voltage, an output portion producing a desired output voltage from an input voltage in such a way that the error voltage is reduced, and a clamping portion setting, during a predetermined period after startup of the power supply device, an upper limit of the error voltage to a value that is lower than a value obtained at normal times, such that the lower the input voltage the higher the upper limit, the higher the input voltage the lower the upper limit.

19 Claims, 12 Drawing Sheets

POWER SUPPLY DEVICE INCLUDING A CLAMPING PORTION TO LIMIT AND ERROR VOLTAGE AND ELECTRONIC APPLIANCE PROVIDED THEREWITH

This application is based on Japanese Patent Application No. 2007-203851 filed on Aug. 6, 2007, the contents of which are hereby incorporated by reference.

BACKGROUND OF THE INVENTION

1. Field of the Invention

The present invention relates to power supply devices that produce a desired output voltage from an input voltage, and to electronic appliances provided therewith.

2. Description of Related Art

Conventionally, as one of the stabilized power supplies that suffer less from heat loss and operate with a relatively high degree of efficiency if there is a great difference between the input and output, a switching regulator that produces a desired output voltage from an input voltage by driving an energy storage element (such as a capacitor or a coil) by performing on/off control (duty control) of an output transistor is widely used.

A conventional common switching regulator is provided with an error amplifier that amplifies a difference between a feedback voltage Vfb varying with an output voltage Vout and a predetermined reference voltage Vref, and is configured so as to perform on/off control of an output transistor by using an output signal (error voltage Verr) of the error amplifier. More specifically, such a switching regulator is configured so as to produce a PWM (pulse width modulation) signal having a duty ratio commensurate with a comparison result between the error voltage Verr and a predetermined slope voltage Vslp (triangular or ramp wave) and control on/off of the output transistor by using the PWM signal thus produced.

In addition, the conventional switching regulator is provided with a soft-start circuit as a means of preventing an inrush current at startup. More specifically, the soft-start circuit is configured so as to produce a soft-start voltage Vss that starts to rise gradually as an enable signal EN (operation enable signal) rises, and a PWM comparator is configured so as to compare either the error voltage Verr or the soft-start voltage Vss, whichever is lower, with the slope voltage Vslp, and thereby produce a PWM signal having a duty ratio commensurate with the comparison result.

An example of a conventional technology related to what has been described thus far is seen in JP-A-H7-336999 (hereinafter, "Patent Document 1"), which the applicant of the present invention once filed.

Certainly, with the conventional switching regulator described above, it is possible to prevent an inrush current at startup by using the soft-start circuit.

However, the conventional switching regulator has the following drawback. In this switching regulator, a coil current IL is reduced by gradually increasing the on-duty ratio of the output transistor. Although this helps prevent an inrush current at startup, the rise of the output voltage Vout and hence the response speed of output feedback control is slowed down.

In particular, LED drivers that adjust the brightness (the average LED current value) of LEDs (light-emitting diodes) by driving the enable signal EN with PWM (pulse width modulation) suffer a reduction in accuracy of brightness adjustment with a reduction in response speed of the above-described output feedback control.

It is true that disabling soft-start enhances the response speed of the output feedback control. However, as indicated by symbol (X) in FIG. 12, this results in the occurrence of an inrush current in the coil current IL every time the enable signal EN rises, raising the possibility of breakdown of the coil or the output transistor.

In addition, as indicated by symbol (Y) in FIG. 12, disabling soft-start to enhance the response speed makes the rising speed of the feedback voltage Vfb depend heavily on variations in the input voltage Vin (in this figure, a solid line indicates the behavior observed when the input voltage Vin is high, and a broken line indicates that observed when the input voltage Vin is low).

In particular, in the aforementioned LED drivers, when the duty ratio of the enable signal EN is small (when the brightness is set low), the rising speed of the feedback voltage Vfb varies greatly depending on variations in the input voltage Vin. This results in variations in LED current (=Vfb/R), which may be visually recognized by the user as flicker.

Incidentally, the cause of the dependence of the rising speed of the feedback voltage Vfb on input voltage is as follows. Since the input voltage Vin varies, whereas a limit value ILmax of the coil current IL is kept constant, the input power (=ILmax×Vin) of the switching regulator varies with the variations in input voltage Vin, resulting in variations in rising speed of the output voltage Vout (and hence feedback voltage Vfb).

SUMMARY OF THE INVENTION

In view of the conventionally experienced problems described above, an object of the present invention is to provide power supply devices that can achieve output feedback control having no input voltage dependence and offering high responsivity, and that can reduce an inrush current at startup, and to provide electronic appliances provided with such power supply devices.

To achieve the above object, according to the present invention, a power supply device is provided with: an error amplifier producing an error voltage by amplifying a difference between a feedback voltage according to an output voltage and a predetermined reference voltage; an output portion producing a desired output voltage from an input voltage in such a way that the error voltage is reduced; and a clamping portion setting, during a predetermined period after startup of the power supply device, an upper limit of the error voltage to a value that is lower than a value obtained at normal times, such that the lower the input voltage the higher the upper limit, the higher the input voltage the lower the upper limit.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Hereinafter, as an example of implementation, a description will be given of a case where the present invention is applied to a DC/DC converter that is incorporated into a cellular phone terminal, and that produces a drive voltage to be fed to different parts (such as a backlight illuminating the back of a TFT (thin film transistor) liquid crystal panel) of the terminal by converting an input voltage from a battery.

Figure 1:
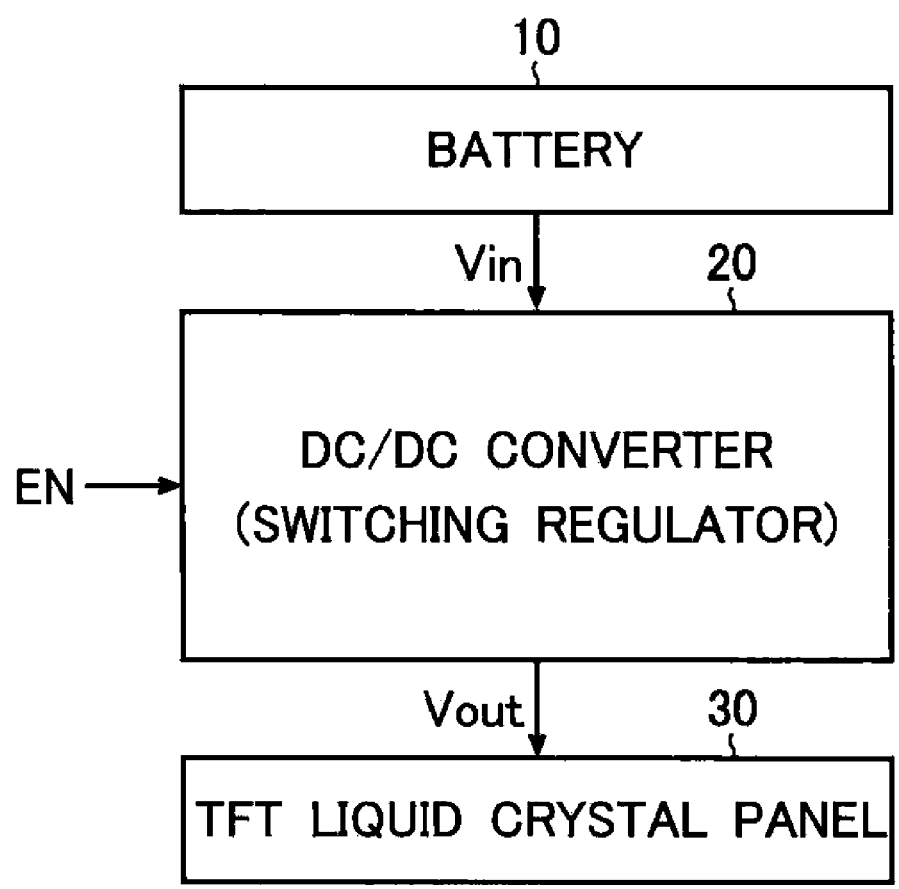
FIG. 1 is a block diagram showing an embodiment of a cellular phone terminal according to the invention.

FIG. 1 is a block diagram (in particular, the part corresponding to a power supply system for a TFT liquid crystal panel) showing an embodiment of the cellular phone terminal according to the invention. As shown in the figure, the cellular phone terminal of this embodiment includes a battery 10 that supplies power to the terminal, a DC/DC converter 20 that converts an output of the battery 10, and a TFT liquid crystal panel 30 on which the cellular phone terminal displays information etc. Needless to say, the cellular phone terminal further includes, although unillustrated, other functional blocks with which it achieves its essential capabilities (communication and other capabilities), such as a transmitter/receiver circuit, a loudspeaker, a microphone, an operation portion, and a memory.

The DC/DC converter 20 produces a constant output voltage Vout from an input voltage Vin applied thereto from the battery 10, and supplies the output voltage Vout thus produced to the TFT liquid crystal panel 30 (in particular, to the backlight thereof).

Figure 2:
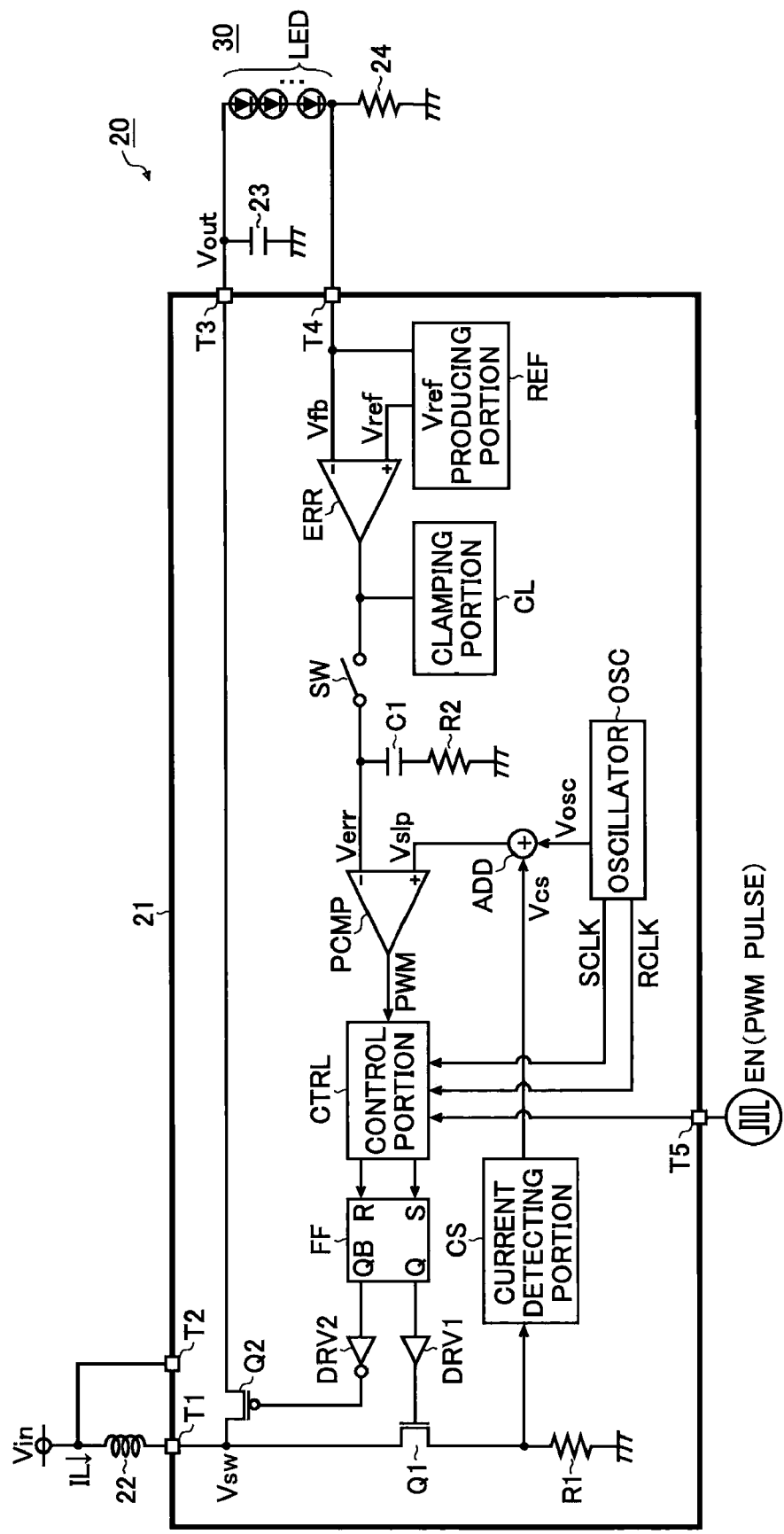
FIG. 2 is a circuit diagram showing an example of the configuration of the DC/DC converter 20.

FIG. 2 is a circuit diagram (the part thereof including blocks) showing an example of the configuration of the DC/DC converter 20. As shown in the figure, the DC/DC converter 20 of this embodiment is a step-up switching regulator (chopper regulator) including, in addition to a switching power supply IC 21, an external coil 22, a capacitor 23, and a resistor 24. The DC/DC converter 20 supplies the output voltage Vout to a light-emitting diode array (hereinafter an "LED (light-emitting diode) array") constituting the backlight of the TFT liquid crystal panel 30 as a drive voltage for the LED array.

The switching power supply IC 21 includes, in addition to an N-channel field-effect transistor Q1, a P-channel field-effect transistor Q2, a capacitor C1, resistors R1 and R2, drivers DRV1 and DRV2, a reset-first RS flip-flop FF, a current detecting portion CS, a control portion CTRL, a PWM comparator PCMP, an oscillator OSC, an adder ADD, a switch SW, a clamping portion CL, an error amplifier ERR, and a reference voltage producing portion REF, external terminals T1 to T5 for electrical connection with the outside. In addition to the above-described circuit blocks, the switching power supply IC 21 may be provided with other protection circuit blocks (such as a thermal shutdown circuit, an over-voltage protection circuit, and a short-circuit protection circuit) as appropriate.

The drain of the transistor Q1 is connected to the external terminal T1 (switch terminal). The source of the transistor Q1 is connected to the ground via the resistor R2, and is connected to an input point of the current detecting portion CS. The drain of the transistor Q2 is connected to the external terminal T1, and the source thereof is connected to the external terminal T3 (output terminal).

One input point of the adder ADD is connected to an output point (detection voltage output point) of the current detecting portion CS, and the other input point of the adder ADD is connected to a first output point (triangular wave voltage output point) of the oscillator OSC.

The non-inverting input point (+) of the PWM comparator PCMP is connected to an output point (slope voltage output point) of the adder ADD. The inverting input point (−) of the PWM comparator PCMP is connected to an output point of the error amplifier ERR via the switch SW, and is connected to the ground via the capacitor C1 and the resistor R2.

The inverting input point (−) of the error amplifier ERR is connected to the external terminal T4 (feedback input terminal), and the non-inverting input point (+) of the error amplifier ERR is connected to an output point (reference voltage output point) of the reference voltage producing portion REF. Incidentally, the clamping portion CL is connected to the output point of the error amplifier ERR.

To the control portion CTRL, a comparison signal PWM from the PWM comparator PCMP, a set clock signal SCLK and a reset clock signal RCLK from the oscillator OSC, and an enable signal EN from the external terminal T5 are inputted.

The set input point (S) of the RS flip-flop FF is connected to a set signal output point of the control portion CTRL. The reset input point (R) of the RS flip-flop FF is connected to a reset signal output point of the control portion CTRL. The output point (Q) of the RS flip-flop FF is connected to the gate of the transistor Q1 via the driver DRV1. The inverted output point (QB) of the RS flip-flop FF is connected to the gate of the transistor Q2 via the driver DRV2 (inverter).

Outside the switching power supply IC 21, the external terminal T1 (switch terminal) is connected to an output point (a point to which the input voltage Vin is applied) of the battery 10 via the coil 22. The external terminal T2 (input terminal) is directly connected to the output point of the battery 10. The external terminal T3 (output terminal) is connected to the ground via the capacitor 23, and is connected to the anode of the LED array constituting the backlight of the TFT liquid crystal panel 30, so as to serve as a terminal from which the output voltage Vout is outputted. The cathode of the LED array is connected to the ground via the resistor 24, and is connected to the external terminal T4 (feedback input terminal) of the switching power supply IC 21. The external terminal T5 (enable terminal) is connected to a point to which the enable signal EN (PWM pulse signal) is applied.

A basic operation (DC/DC conversion operation) of the DC/DC converter 20 configured as described above will be described in detail.

In the switching power supply IC 21, the transistor Q1 is an output transistor that is controlled to turn on/off according to an output signal (output signal Q) of the driver DRV1, and the transistor Q2 is a synchronous rectifier transistor that is controlled to turn on/off according to an output signal (an inverted signal of an inverted output signal QB) of the driver DRV2. The RS flip-flop FF is a means for performing switching control for the transistors Q1 and Q2 complementarily in obtaining an output voltage Vout by stepping up an input voltage Vin.

It should be understood that the term "complementarily" used in this specification covers not only cases where the turning on and off of the transistor Q1 takes place exactly oppositely to that of the transistor Q2 but also cases where, from the perspective of preventing a through current, the turning on and off of the transistor Q1 takes place oppositely to but with a predetermined delay relative to that of the transistor Q2.

When the transistor Q1 is turned on, a coil current IL flows through the coil 22 toward the ground via the transistor Q1, and electric energy is stored in the coil 22. If electric charge has already been stored in the capacitor 23 in the on period of the transistor Q1, a current from the capacitor 23 flows through the LED array. At this point, since the transistor Q2, which is a synchronous rectifier element, is complementarily turned off relative to the on state of the transistor Q1, no current flows into the transistor Q1 from the capacitor 23.

On the other hand, when the transistor Q1 is turned off, a counter electromotive force is produced in the coil 22, whereby the electric energy stored therein is liberated. At this point, since the transistor Q2 is complementarily turned on relative to the off state of the transistor Q1, the current flowing from the coil 22 via the transistor Q2 flows into a load, namely the LED array, and also flows into the ground via the capacitor 23, thereby charging the capacitor 23. The above-described operation is repeatedly performed, whereby a direct-current output smoothed by the capacitor 23 is supplied to the load, namely the LED array.

As described above, the switching power supply IC 21 of this embodiment functions as one component element of a chopper step-up circuit that produces an output voltage Vout by stepping up an input voltage Vin by driving the energy storage element, namely the coil 22, by performing on/off control of the transistors Q1 and Q2.

In the switching power supply IC 21 of this embodiment, the control portion CTRL has a configuration (a configuration in which so-called power control PWM brightness adjustment is adopted) in which step-up operation is enabled/disabled according to a logic level (high level/low level) of the enable signal EN (step-up operation enable signal) so as to adjust the brightness of the LED array with PWM. Specifically, the control portion CTRL is so configured that step-up operation is enabled when the enable signal EN takes a high level, and step-up operation is disabled when the enable signal EN takes a low level. Though not illustrated in FIG. 2, the enable signal EN is also inputted to other circuit portions included in the switching power supply IC 21, and the operations of these circuit portions are enabled/disabled according to the enable signal EN.

Next, with reference to FIG. 3, output feedback control of the DC/DC converter 20 configured as described above will be described in detail.

Figure 3:
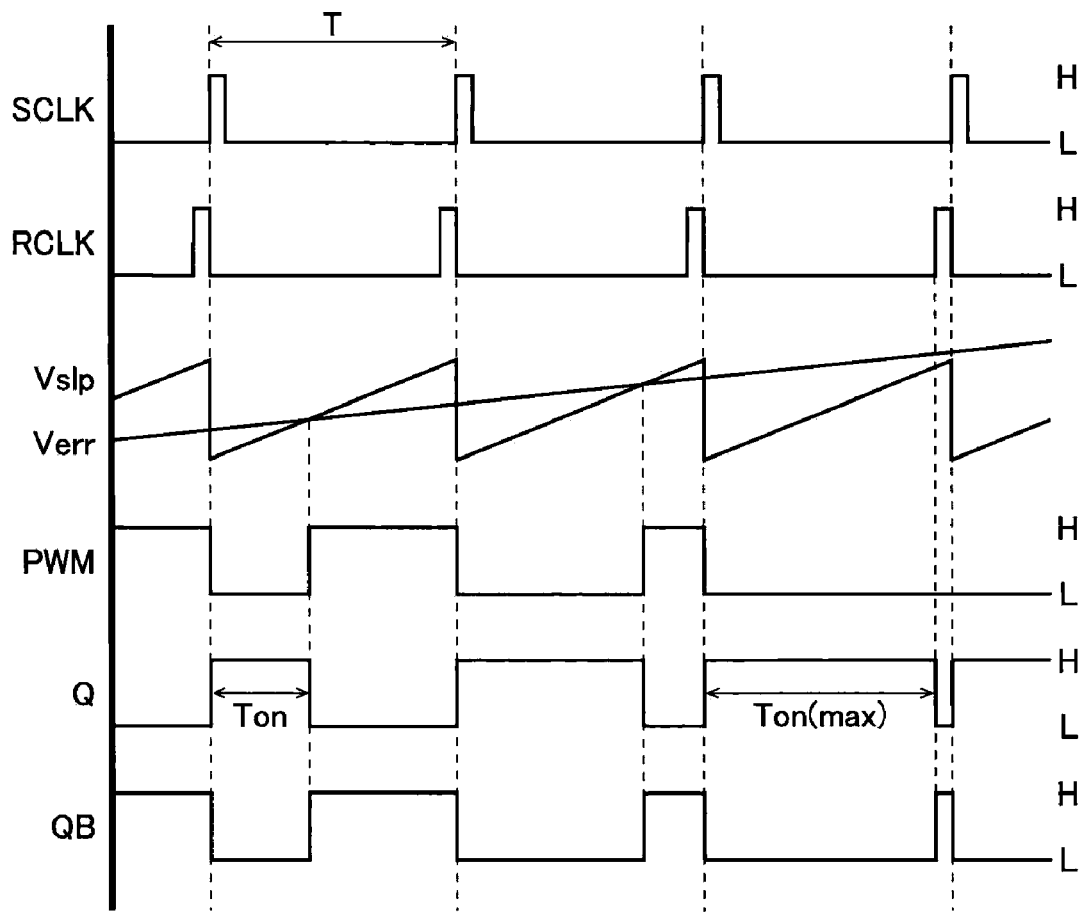
FIG. 3 is a timing chart illustrating output feedback control of the DC/DC converter 20.

FIG. 3 is a timing chart illustrating the output feedback control of the DC/DC converter 20.

In the switching power supply IC 21, the error amplifier ERR produces an error voltage Verr by amplifying a difference between the feedback voltage Vfb (corresponding to an actual measurement value of the output voltage Vout) outputted from one end of the resistor 24 and the reference voltage Vref (corresponding to a target set value of the output voltage Vout) produced by the reference voltage producing portion REF. That is, the lower the output voltage Vout is than the target set value thereof, the higher the voltage level of the error voltage Verr becomes.

On the other hand, the PWM comparator PCMP compares the error voltage Verr applied to the inverting input point (−) thereof with the slope voltage Vslp applied to the non-inverting input point (+) thereof, and produces a comparison signal PWM having a logic according to the comparison result. That is, if the error voltage Verr is higher than the slope voltage Vslp, the comparison signal PWM takes a low level; if the error voltage Verr is lower than the slope voltage Vslp, the comparison signal PWM takes a high level.

Incidentally, the slope voltage Vslp described above is an output voltage of the adder ADD that performs addition on a reference triangular wave voltage Vosc (triangular or ramp wave) produced by the oscillator OSC and a detection voltage Vcs (a voltage signal according to the coil current IL) produced by the current detecting portion CS.

The control portion CTRL outputs the set clock signal SCLK inputted from the oscillator OSC and the comparison signal PWM inputted from the PWM comparator PCMP to the set input point (S) and the reset input point (R), respectively, of the RS flip-flop FF.

Thus, the RS flip-flop FF operates so as to make the output signal Q take a high level (the inverted output signal QB take a low level) at the rising edge of the set clock signal SCLK, and make the output signal Q take a low level (the inverted output signal QB take a high level) at the rising edge of the comparison signal PWM.

As a result, the gate voltage of the transistors Q1 and Q2 is maintained at a high level from the time when the set clock signal SCLK rises to a high level until the comparison signal PWM rises to a high level. This causes the transistor Q1 to be turned on and the transistor Q2 to be turned off. On the other hand, the gate voltage of the transistors Q1 and Q2 is maintained at a low level from the time when the comparison signal PWM rises to a high level until the next rise of the set clock signal SCLK. This causes the transistor Q1 to be turned off and the transistor Q2 to be turned on.

That is, the on-duty ratio (the ratio of the on period Ton of the transistor Q1 to a unit period T) of the DC/DC converter 20 varies successively depending on the interval from when the set clock signal SCLK rises to a high level to when the comparison signal PWM rises to a high level, and hence on which of the error voltage Verr and the slope voltage Vslp is relatively higher than the other.

As described above, in the DC/DC converter 20 of a peak current mode control type, on/off control of the transistors Q1 and Q2 is performed based not only on the monitoring result of the output voltage Vout but also on the monitoring result of the coil current IL flowing through the transistor Q1.

Therefore, with the DC/DC converter 20 of this embodiment, even when the error voltage Verr cannot follow a sharp variation in load, it is possible to directly control on/off of the transistors Q1 and Q2 according to the monitoring result of the coil current IL flowing through the transistor Q1. This makes it possible to effectively suppress variations in the output voltage Vout. That is, the DC/DC converter 20 of this embodiment eliminates the need to use a large-capacity capacitor as the capacitor 23, making it possible to prevent an unnecessary increase in cost and an undesirable increase in the size of the capacitor 23.

In addition, the DC/DC converter 20 of this embodiment has a function (duty lock function) of imposing a duty limit (for example, a maximum duty ratio: 95%) on the DC/DC converter 20 by setting a predetermined upper limit Ton(max) for the on period Ton of the transistor Q1 by using the reset clock signal RCLK (having, for example, a duty ratio of 5%) which rises at the end of the unit period T as shown in FIG. 3.

Specifically, in the switching power supply IC 21, if the comparison signal PWM does not rise to a high level for some reason, the control portion CTRL forcedly resets the RS flip-flop FF by using the reset clock signal RCLK. That is, the RS flip-flop FF operates so as to make the output signal Q take a high level (the inverted output signal QB take a low level) at the rising edge of the set clock signal SCLK, and make the output signal Q take a low level (the inverted output signal QB take a high level) at the rising edge of the reset clock signal RCLK. As a result, the on-duty ratio of the DC/DC converter 20 is allowed to rise only to an upper limit depending on the reset clock signal RCLK.

With this configuration, even when something unusual occurs in the DC/DC converter 20, there is no possibility of the on-duty ratio of the DC/DC converter 20 rising to an unintended excessive value. This helps increase safety of the appliance.

Next, the configuration and operation of the reference voltage producing portion REF will be described in detail.

Figure 4:
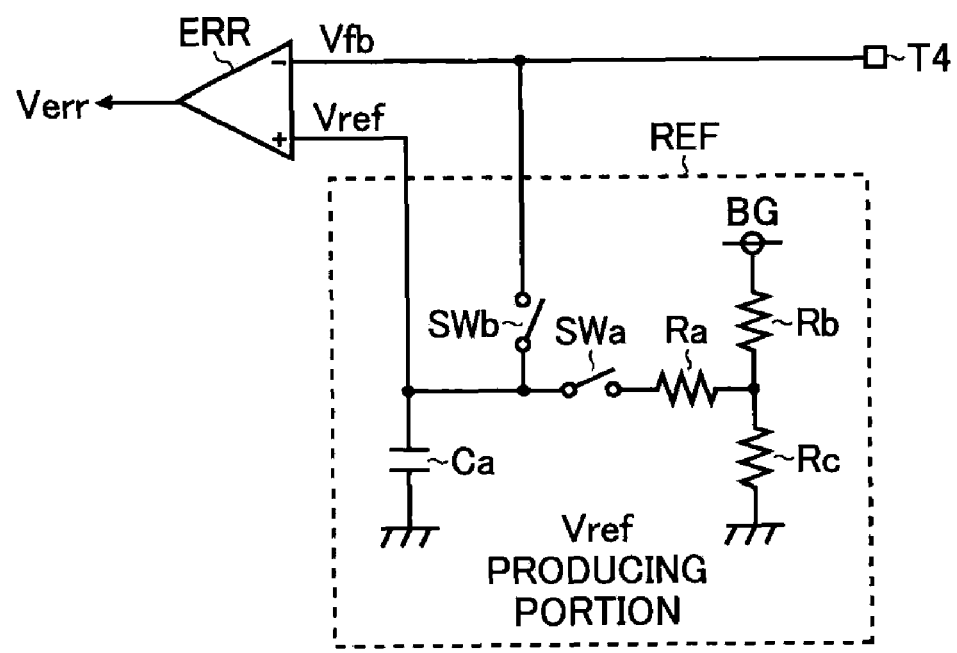
FIG. 4 is a circuit diagram showing an example of the configuration of the reference voltage producing portion REF.

FIG. 4 is a circuit diagram showing an example of the configuration of the reference voltage producing portion REF.

As shown in the figure, the reference voltage producing portion REF includes a capacitor Ca, resistors Ra, Rb, and Rc, and switches SWa and SWb.

One end of the capacitor Ca is connected to the non-inverting input point (+) of the error amplifier ERR, and the other end of the capacitor Ca is connected to the ground. The switches SWa and SWb are each connected at one end thereof to the non-inverting input point (+) of the error amplifier ERR. The switch SWa is connected at the other end thereof to one end of the resistor Ra. The switch SWb is connected at the other end thereof to the inverting input point (−) of the error amplifier ERR. The other end of the resistor Ra is connected to a point to which a bandgap voltage BG (a constant voltage having no input voltage dependence or ambient temperature dependence) via the resistor Rb, and is connected to the ground via the resistor Rc.

During the interval that the enable signal EN takes a high level, the switch SWa is controlled to turn on/off according to a predetermined clock signal. At this point, only when the switch SWa is on, a voltage (a voltage outputted from a node at which the resistor Rb and the resistor Rc are connected together) obtained by diving the bandgap voltage BG is applied to a CR time constant circuit composed of the capacitor Ca and the resistor Ra. On the other hand, during the interval that the enable signal EN takes a low level, the switch SWa is off.

In addition, during the interval that the enable signal EN takes a high level, the switch SWb is off; during the interval that the enable signal EN takes a low level, the switch SWVb is on.

Thus, when the enable signal EN rises to a high level, the reference voltage Vref applied to the non-inverting input point (+) of the error amplifier ERR rises gradually with a predetermined time constant, and predetermined output feedback control is performed such that the feedback voltage Vfb becomes identical to the reference voltage Vref.

Figure 5:
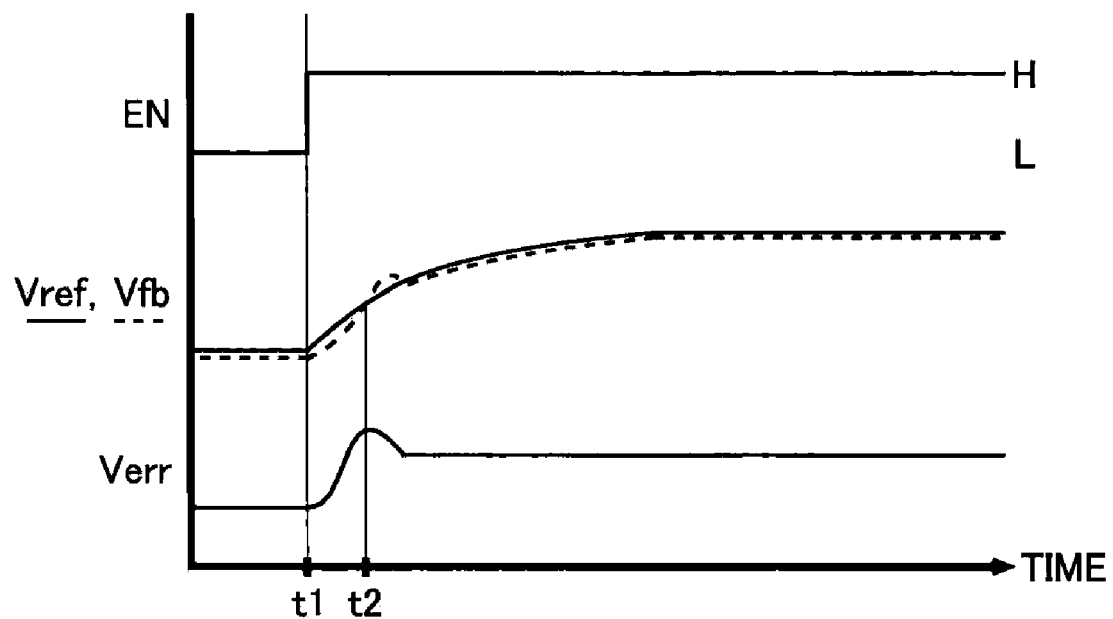
FIG. 5 is a timing chart showing how the reference voltage Vref, the feedback voltage Vfb, and the error voltage Verr behave at startup.

FIG. 5 is a timing chart showing how the reference voltage Vref (solid line), the feedback voltage Vfb (broken line), and the error voltage Verr behave when the enable signal EN rises.

As shown in the figure, after the enable signal EN rises at time t1, the feedback voltage Vfb quickly intersects the reference voltage Vref at time t2 regardless of the magnitude of the input power, and the error amplifier ERR operates so as to maintain this state. As a result, after time t2, it is possible to make the feedback voltage Vfb rise smoothly without overshoot, such that the rise of the feedback voltage Vfb is determined by the gentle rise of the reference voltage Vref, without the need for clamping adjustment (overcurrent limit adjustment) to the error voltage Verr, which will be described later.

That is, unlike the conventional configuration in which the on-duty ratio of the comparison signal PWM is controlled by using a soft-start voltage, the DC/DC converter 20 of this embodiment can eliminate the dependence of the feedback voltage Vfb on input voltage.

Incidentally, in the reference voltage producing portion REF shown in FIG. 4, the capacitor Ca is charged only when the switch SWa is on. With this configuration, it is possible to set an apparent CR time constant to a large value by reducing the on-duty ratio of the switch SWa without increasing the capacitance value of the capacitor Ca or the resistance value of the resistor Ra. This makes it possible to reduce the chip size.

Here, it is also possible to use the above-described reset clock signal RCLK having an on-duty ratio of 5% as the clock signal used for on/off control of the switch SWa. With this configuration, there is no need to provide an extra clock signal, making it possible to achieve the reduction in size of the circuit.

Next, with reference to FIG. 6, short-circuit operation performed with the switch SWb for input of the error amplifier ERR will be described in detail.

Figure 6:
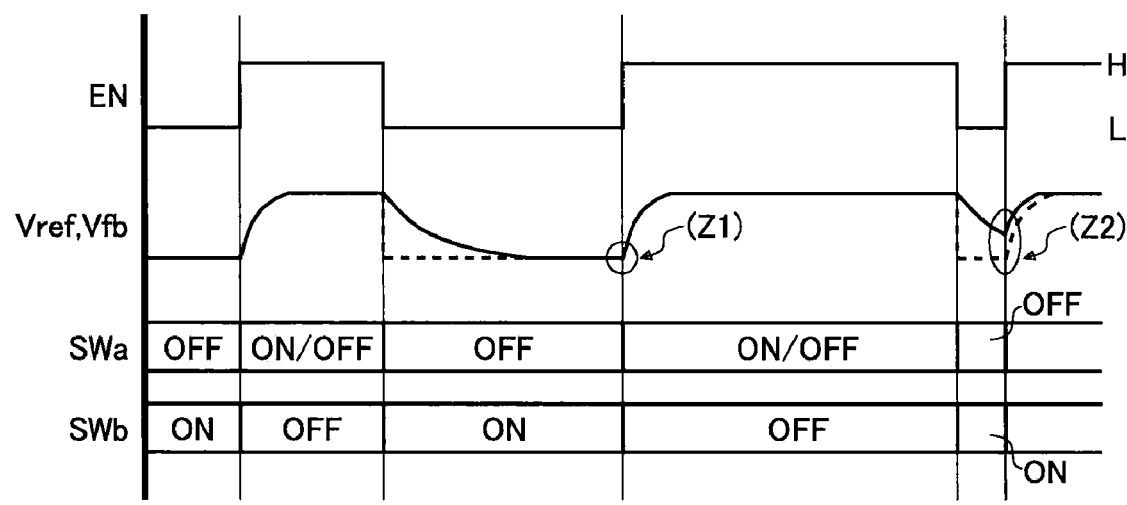
FIG. 6 is a timing chart illustrating short-circuit operation performed with the switch SWb for input of the error amplifier ERR.

FIG. 6 is a timing chart illustrating short-circuit operation performed with the switch SWb for input of the error amplifier ERR, showing the voltage waveforms of the enable signal EN, the reference voltage Vref, and the feedback voltage Vfb, and the on/off states of the switches SWa and SWb.

In FIG. 6, the reference voltage Vref and the feedback voltage Vfb are indicated with a single solid line, because they become identical with each other by output feedback control when the enable signal EN takes a high level, and become identical with each other via the switch SWb when the enable signal EN takes a low level.

When the enable signal EN drops from a high level to a low level, the feedback voltage Vfb decreases in a manner similar to that of the output voltage Vout. At this point, if the on-duty ratio of the enable signal EN is large, the on period of the next cycle begins before the feedback voltage Vfb drops to a low level, causing the feedback voltage Vfb to rise again.

With consideration given to such a possibility, suppose that a configuration in which the reference voltage Vref is dropped to a low level as the enable signal EN drops to a low level (a configuration in which the capacitor Ca is discharged) is adopted. Then, as long as the on-duty ratio of the enable signal EN is small, and, as indicated by symbol (Z1) in FIG. 6, the feedback voltage Vfb drops to a low level when the on period of the next cycle begins, this configuration presents no problem, because both the reference voltage Vref (broken line) and the feedback voltage Vfb (solid line) rise again from a low level. However, if the on-duty ratio of the enable signal EN is large, and, as indicated by symbol (Z2) in FIG. 6, the on period of the next cycle begins before the feedback voltage Vfb drops to zero, the feedback voltage Vfb (solid line)

becomes higher than the reference voltage Vref (broken line). This undesirably stops the step-up operation.

Thus, the reference voltage producing portion REF shown in FIG. 4 has a configuration in which the reference voltage Vref and the feedback voltage Vfb are made identical with each other by turning the switch SWb on during a low level period of the enable signal EN (in other words, a configuration in which a value of the feedback voltage Vfb obtained when the enable signal EN is turned from a low level to a high level again is set as an initial value of the reference voltage Vref, and the reference voltage Vref is made to rise from that initial value with a predetermined time constant).

With this configuration, it is possible to avoid separation between the reference voltage Vref and the feedback voltage Vfb without depending on the on-duty ratio of the e enable signal EN, and continue the output feedback control in an appropriate manner.

Next, the configuration and operation of the clamping portion CL will be described in detail.

Figure 7:
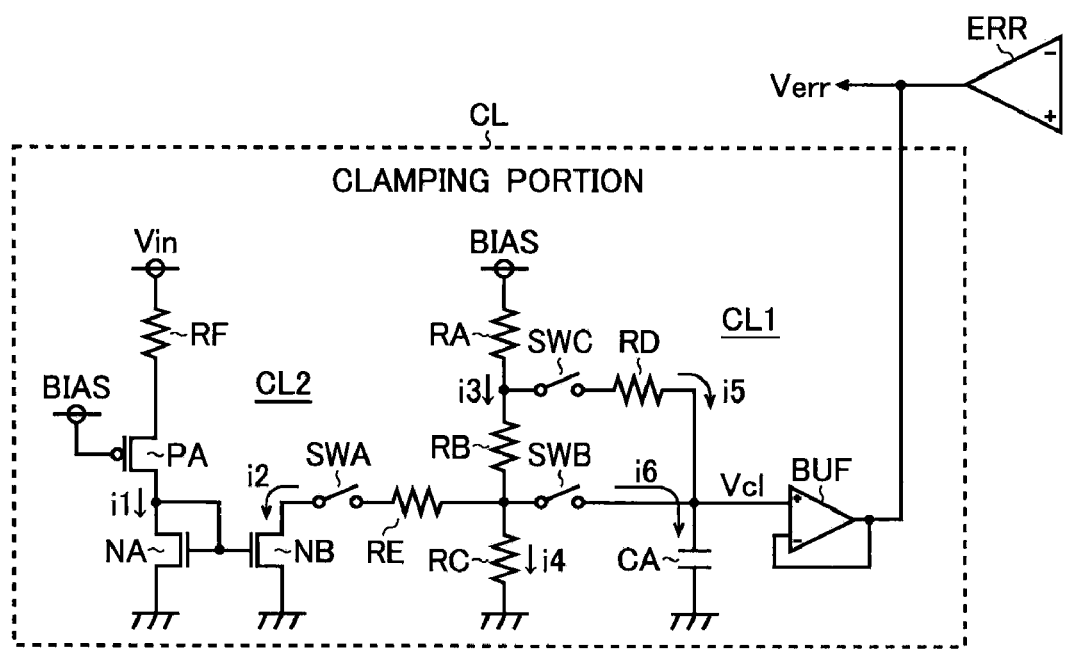
FIG. 7 is a circuit diagram showing an example of the configuration of the clamping portion CL.

FIG. 7 is a circuit diagram showing an example of the configuration of the clamping portion CL.

As shown in the figure, the clamping portion CL includes N-channel field-effect transistors NA and NB, a P-channel field-effect transistor PA, a capacitor CA, resistors RA, RB, RC, RD, RE, and RF, switches SWA, SWB, and SWC, and a buffer BUF.

The resistors RA, RB, and RC are connected in series in the order shown in the figure between a point to which a bias voltage (for example, 1.2 V) is applied and the ground. A node at which the resistor RA and the resistor RB are connected together is connected to the non-inverting input point (+) of the buffer BUF via the switch SWC and the resistor RD. A node at which the resistor RB and the resistor RC are connected together is connected to the non-inverting input point (+) of the buffer BUF via the switch SWB. The output point of the buffer BUF is connected to the output point of the error amplifier ERR, and is connected to the inverting input point (−) of the buffer BUF. One end of the capacitor CA is connected to the non-inverting input point (+) of the buffer BUF, and the other end of the capacitor CA is connected to the ground. The above-described component elements together form a clamp voltage setting circuit CL1.

The source of the transistor PA is connected, via the resistor RF, to a point to which the input voltage Vin is applied. The gate of the transistor PA is connected to a point to which the bias voltage is applied. The drain of the transistor PA is connected to the drain of the transistor NA. The source of the transistor NA is connected to the ground. The gates of the transistors NA and NB are connected together, and a node at which the transistors NA and NB are connected together is connected to the drain of the transistor NA. The source of the transistor NB is connected to the ground. The drain of the transistor NB is connected, via the switch SWA and the resistor RE, to a node at which the resistor RB and the resistor RC are connected together. The above-described component elements together form an input voltage regulating circuit CL2.

Figure 8:
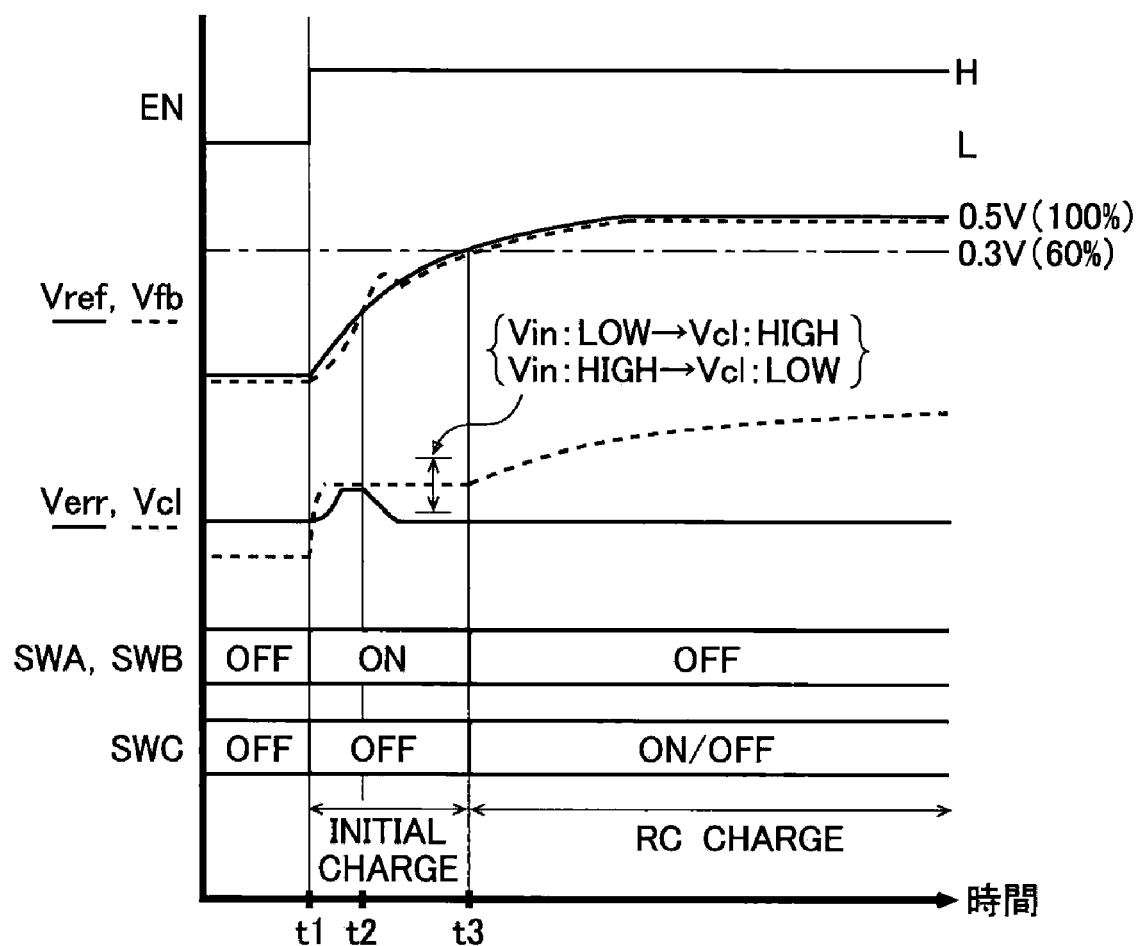
FIG. 8 is a timing chart illustrating clamping operation performed for the error voltage Verr at startup.

FIG. 8 is a timing chart illustrating clamping operation performed for the error voltage Verr at startup, showing the voltage waveforms of the enable signal EN, the reference voltage Vref (solid line), the feedback voltage Vfb (broken line), the error voltage Verr (solid line), and the clamp voltage Vcl (broken line), and the on/off states of the switches SWA, SWB, and SWC.

When the enable signal EN is turned to a high level at time t1, the switches SWA and SWB are turned on, and the switch SWC is turned off. At this point, the capacitor CA is charged with a current i6 (a current obtained by subtracting, from a current i3 flowing, via the resistors RA and RB, from a point to which the bias voltage BIAS is applied, a current i2 flowing into the ground via the resistor RE, the switch SWA, and the transistor NB and a current i4 flowing into the ground via the resistor RC) flowing via the switch SWB. Then, an upper limit of the error voltage Verr is set by the clamp voltage Vcl outputted from one end of the capacitor CA.

Incidentally, during an initial charging period between time t1 and time t3 (a time point at which the reference voltage Vref reaches 60% of the target value), the upper limit of the error voltage Verr is set to a value lower than that obtained at normal times so as to prevent an inrush current at startup.

The above-described current i2 is produced by the current mirror circuit composed of the transistors NA and NB by mirroring a current i1 commensurate with a difference between the input voltage Vin and the bias voltage (for example, 1.2 V). That is, the current i2 varies depending on the input voltage, such that the higher the input voltage Vin the larger the current i2, the lower the input voltage Vin the smaller the current i2.

Thus, the higher the input voltage Vin and hence the larger the current i2, the lower the clamp voltage Vcl (and hence the upper limit of the error voltage Verr); the lower the input voltage Vin and hence the smaller the current i2, the higher the clamp voltage Vcl.

With this configuration, the coil current IL is reduced when the input voltage Vin is high, and the coil current IL is increased when the input voltage Vin is low. This makes the input power (=input voltage Vin×coil current IL) constant irrespective of the voltage level of the input voltage Vin, making it possible to stabilize the rise of the output voltage Vout (and hence the feedback voltage Vfb) while appropriately reducing the peak value of the coil current IL (for example, to 350 mA or less).

Incidentally, it is simply necessary to continue a period (initial charging period) during which the clamp voltage Vcl varies depending on the input voltage Vin until the feedback voltage Vfb becomes equal to the reference voltage Vref, whereby the state of the output feedback control is locked, for example, until the reference voltage Vref reaches 60% (e.g. 0.3 V) of the target value (e.g. 0.5 V).

At time t3, when the reference voltage Vref reaches 60% of the target value, the switches SWA and SWB are turned off, and the switch SWC is controlled to turn on/off according to a predetermined clock signal. At this point, the capacitor CA is charged with a current i5 flowing via the switch SWC and the resistor RD. Thus, during a period (RC charging period) after time t3, the clamp voltage Vcl increases gradually with a predetermined time constant, and the upper limit of the error voltage Verr gradually increases accordingly.

As described above, after the completion of the initial charging period, the upper limit of the error voltage Verr increases gradually with a predetermined time constant. With this configuration, it is possible to prevent a state in which voltage cannot be stepped up due to reduced power (input power shortage) while maintaining a smooth rising waveform of the output voltage Vout (and hence the feedback voltage Vfb) by preventing a sudden increase in the coil current IL.

Incidentally, in the clamping portion CL shown in FIG. 7, the capacitor CA is charged only when the switch SWC is on. With this configuration, it is possible to set an apparent CR time constant to a large value by reducing the on-duty ratio of the switch SWC without increasing the capacitance value of the capacitor CA or the resistance value of the resistor RD. This makes it possible to reduce the chip size.

Here, it is also possible to use the above-described reset clock signal RCLK having an on-duty ratio of 5% as the clock signal used for on/off control of the switch SWC. With this configuration, there is no need to provide an extra clock signal, making it possible to achieve the reduction in size of the circuit.

Next, with reference to FIG. 9, operation performed with the switch SW for retaining a previous value of the error voltage Verr will be described in detail.

Figure 9:
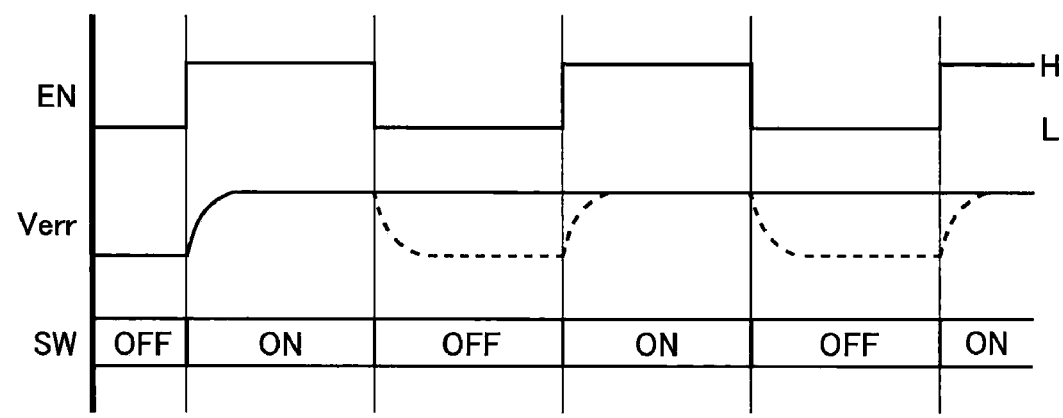
FIG. 9 is a timing chart illustrating operation performed with the switch SW for retaining a previous value of the error voltage Verr.

FIG. 9 is a timing chart illustrating operation performed with the switch SW for retaining a previous value of the error voltage Verr, showing the voltage waveforms of the enable signal EN and the error voltage Verr, and the on/off state of the switch SW. For the error voltage Verr shown in FIG. 9, a solid line indicates a behavior of the present invention, and a broken line indicates a behavior of a conventional example for reference purposes.

In order to shorten a response time of the DC/DC converter 20, a CR time constant of a phase compensation circuit (the capacitor C1 and the resistor R2) connected to the output point of the error amplifier ERR may be made smaller so as to shorten a rise time of the error voltage Verr. Doing so, however, requires the use of a large-capacity capacitor as the capacitor 23 to prevent system oscillation, and it is difficult to mount the large capacitor 23 on the thin panel in terms of mounting area.

Therefore, instead of shortening a rise time of the error voltage Verr, the DC/DC converter 20 of this embodiment is so configured that, from a viewpoint of reducing the amount of change required for the rise of the error voltage Verr, a previous value of the error voltage Verr (a value of the error voltage Verr obtained immediately before the enable signal EN is turned to a low level) is retained while the enable signal EN is at a low level, so as to improve the responsivity of the DC/DC converter 20.

Specifically, as shown in FIG. 2 described above, the switch SW that is controlled to turn on/off according to the enable signal EN is provided between the output point of the error amplifier ERR and the phase compensation circuit.

As described above, with a configuration in which the capacitor C1 for phase compensation is also used for retaining a previous value of the error voltage Verr, the amount of change (the amount of drop) of the error voltage Verr is reduced, as shown in FIG. 9, without increasing the number of elements, allowing the error voltage Verr to rise quickly. This makes it possible to lock the state of the output feedback control quickly.

Figure 10:
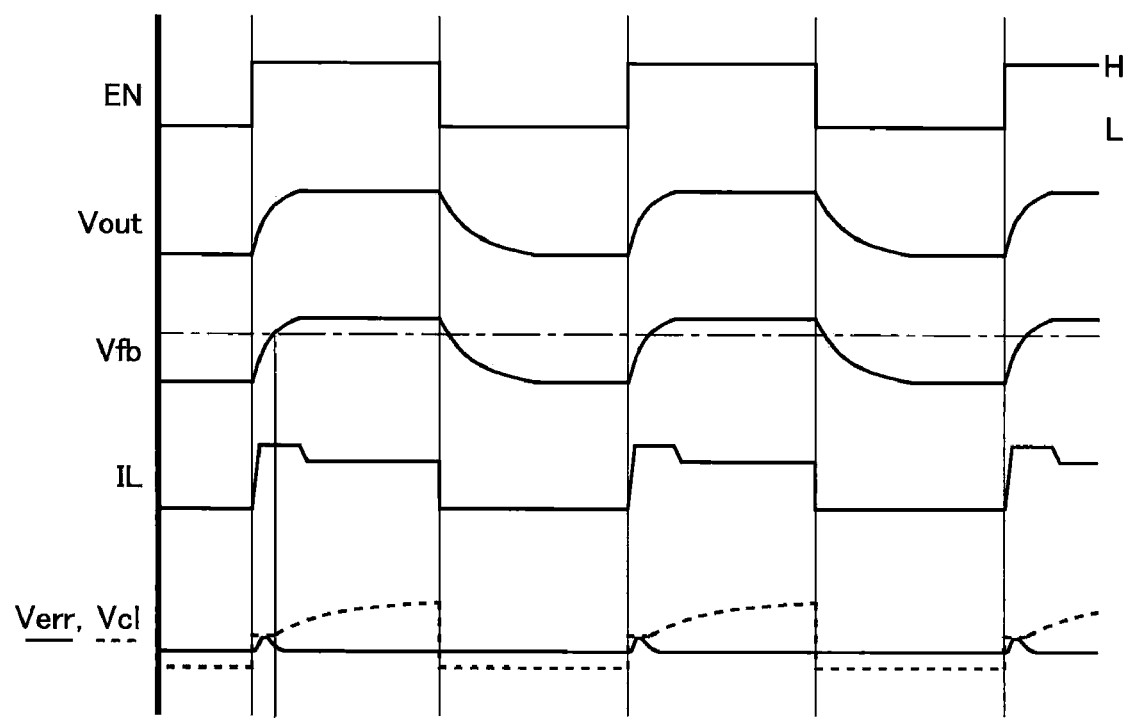
FIG. 10 is a timing chart showing how the output voltage Vout, the feedback voltage Vfb, the coil current IL, the error voltage Verr, and the clamp voltage Vcl behave when the enable signal EN is driven with PWM.

FIG. 10 is a timing chart showing how the output voltage Vout, the feedback voltage Vfb, the coil current IL, the error voltage Verr (solid line), and the clamp voltage Vcl (broken line) behave when the enable signal EN is driven with PWM.

As shown in the figure, with the DC/DC converter 20 of this embodiment, it is possible to achieve output feedback control having no input voltage dependence and offering high responsivity, and reduce an inrush current at startup.

Figure 11:
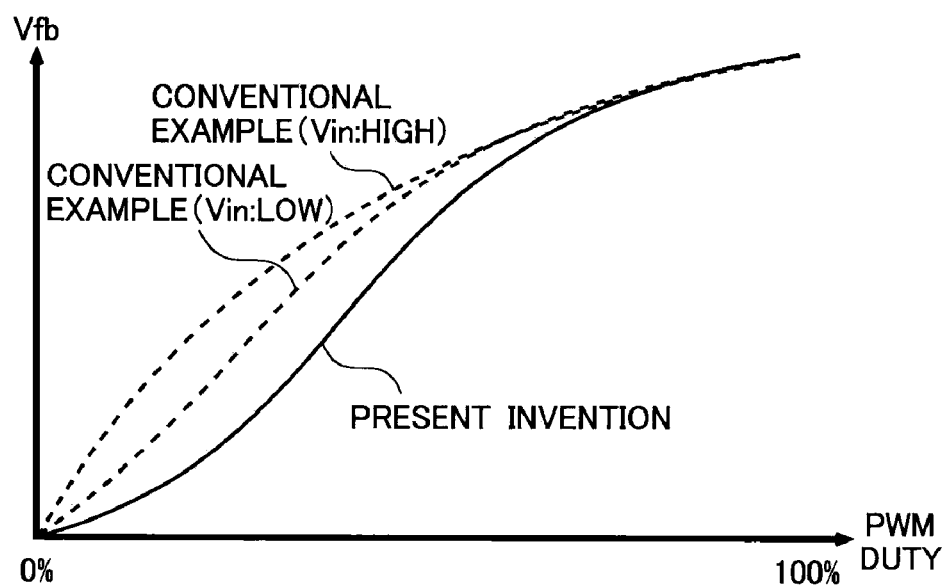
FIG. 11 is a diagram showing the correlation between the duty ratio of the enable signal EN and the feedback voltage Vfb.
Figure 12:
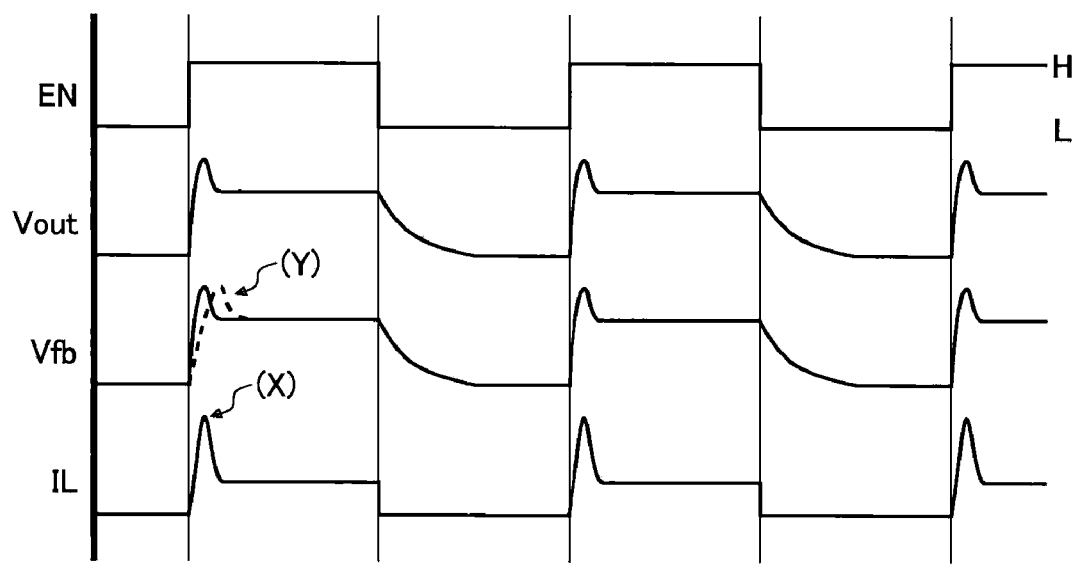
FIG. 12 is a diagram illustrating a conventionally experienced problem arising when no soft-start is provided.

FIG. 11 is a diagram showing the correlation between the duty ratio of the enable signal EN and the feedback voltage Vfb. In this figure, a solid line indicates the feedback voltage Vfb of the present invention, and broken lines indicate feedback voltages (of which one is observed when the input voltage Vin is high and the other is observed when the input voltage Vin is low) of a conventional example for reference purposes.

As shown in the figure, in a conventional example, when the duty ratio of the enable signal EN is small, the feedback voltage Vfb is highly dependent on the input voltage. This causes variations in the LED current (=Vfb/R), resulting in the occurrence of screen flicker. By contrast, with the DC/DC converter 20 of this embodiment, by cooperative use of the above-described soft-start function performed by the reference voltage producing portion REF for the reference voltage Vref, the above-described upper limit control function performed by the clamping portion CL for the error voltage Verr, and the above-described previous value retention function performed by the switch SW for the error voltage Verr, it is possible to reduce screen flicker by reducing a variation range of the feedback voltage Vfb even when the duty ratio of the enable signal EN is small.

Although the embodiment described above deals with a case in which the present invention is applied to a DC/DC converter that is incorporated into a cellular phone terminal, and that produces a drive voltage to be fed to different parts of the terminal by converting an output voltage of a battery, the present invention is not limited to this specific application. The present invention finds wide application in power supply devices that produce a desired output voltage from the input voltage and in electronic appliances provided with such power supply devices.

The invention may be practiced in any other manner than specifically described above, with any modification or variation made within the spirit of the invention.

For example, although the embodiment described above deals with a case in which the present invention is applied to a power supply device of a synchronous rectification type, the present invention is not limited to this specific application. It is also possible to apply the present invention to power supply devices using a diode as a synchronous rectifier element. In so doing, it is simply necessary to connect the anode of the diode to the drain of the output transistor Q1, and connect the cathode of the diode to a point from which the output voltage Vout is outputted.

As described above, according to the present invention, it is possible to achieve output feedback control having no input voltage dependence and offering high responsivity, and reduce an inrush current at startup.

In terms of industrial applicability, the invention is useful in achieving an improvement in responsivity of electronic appliances provided with a power supply device and a reduction in power consumption of such electronic appliances, and is suitable for use in all kinds of electronic appliances provided with a power supply device, such as an electronic appliance operating on a battery.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A power supply device comprising:
an error amplifier producing an error voltage by amplifying a difference between a feedback voltage according to an output voltage and a predetermined reference voltage;
an output portion producing a desired output voltage from an input voltage in such a way that the error voltage is reduced; and
a clamping portion setting, during a predetermined period after startup of the power supply device, an upper limit of the error voltage to a value that is lower than a previously established value, such that the lower the input voltage the higher the upper limit, and the higher the input voltage the lower the upper limit.

2. The power supply device of claim 1, wherein, after the expiration of the predetermined period, the clamping portion gradually increases the upper limit of the error voltage up to the previously established value.

3. The power supply device of claim 1, further comprising: a reference voltage producing portion producing and outputting the reference voltage, wherein, after an enable signal driven with PWM changes to a logic level enabling operation of the power supply device, the reference voltage producing portion gradually increases the reference voltage up to a predetermined target value.

4. The power supply device of claim 3, wherein the reference voltage producing portion makes the reference voltage and the feedback voltage identical with each other while the power supply device is stopped.

5. The power supply device of claim 3, wherein the predetermined period is continued until the reference voltage reaches a predetermined threshold value.

6. The power supply device of claim 1, further comprising:
a previous value retaining portion retaining, while the power supply device is stopped, an error voltage obtained immediately before the power supply device is stopped.

7. The power supply device of claim 6, wherein the previous value retaining portion is a switch connected between an output point of the error amplifier and a phase compensation circuit, the switch being in an on state while the power supply device is operating and in an off state while the power supply device is stopped.

8. The power supply device of claim 1, wherein the output portion comprises:
an output transistor producing the output voltage from the input voltage according to on/off control thereof;
a PWM comparator comparing the error voltage with a predetermined slope voltage, and producing a comparison signal having a duty ratio commensurate with a comparison result thus obtained; and
a control portion performing on/off control of the output transistor by using the comparison signal.

9. The power supply device of claim 8, wherein the output portion further comprises:
a coil connected at one end thereof to a point to which the input voltage is applied, and connected at another end thereof to one end of the output transistor;
a synchronous rectifier element connected at one end thereof to one end of the output transistor, and connected at another end thereof to a point from which the output voltage is outputted; and
a capacitor connected at one end thereof to the point from which the output voltage is outputted, and connected at another end thereof to a point to which a ground voltage is applied,
wherein the output portion produces the output voltage by stepping up the input voltage.

10. An electronic appliance comprising:
a battery that supplies power to the appliance;
a power supply device converting an input voltage from the battery into a desired output voltage; and
a load that is driven by using the output voltage;
wherein the power supply device comprises:
an error amplifier producing an error voltage by amplifying a difference between a feedback voltage according to the output voltage and a predetermined reference voltage;
an output portion producing the output voltage from the input voltage in such a way that the error voltage is reduced; and a clamping portion setting, during a predetermined period after startup of the power supply device, an upper limit of the error voltage to a value that is lower than a previously established value, such that the lower the input voltage the higher the upper limit, and the higher the input voltage the lower the upper limit.

11. The electronic appliance of claim 10, wherein, after the expiration of the predetermined period, the clamping portion gradually increases the upper limit of the error voltage up to the previously established value.

12. The electronic appliance of claim 10, wherein the power supply device further comprises:
a reference voltage producing portion generating and outputting the reference voltage, wherein, after an enable signal driven with PWM changes to a logic level enabling operation of the power supply device, the reference voltage producing portion gradually increases the reference voltage up to a predetermined target value.

13. The electronic appliance of claim 12, wherein the reference voltage producing portion makes the reference voltage and the feedback voltage identical with each other while the power supply device is stopped.

14. The electronic appliance of claim 12, wherein the predetermined period is continued until the reference voltage reaches a predetermined threshold value.

15. The electronic appliance of claim 10, wherein the power supply device further comprises:
a previous value retaining portion retaining, while the power supply device is stopped, an error voltage obtained immediately before the power supply device is stopped.

16. The electronic appliance of claim 15,
wherein the previous value retaining portion is a switch connected between an output point of the error amplifier and a phase compensation circuit, the switch being in an on state while the power supply device is operating and in an off state while the power supply device is stopped.

17. The electronic appliance of claim 10, wherein the output portion further comprises:
an output transistor producing the output voltage from the input voltage according to on/off control thereof;
a PWM comparator comparing the error voltage with a predetermined slope voltage, and producing a comparison signal having a duty ratio commensurate with a comparison result thus obtained; and
a control portion performing on/off control of the output transistor by using the comparison signal.

18. The electronic appliance of claim 17, wherein the output portion further comprises:
a coil connected at one end thereof to a point to which the input voltage is applied, and connected at another end thereof to one end of the output transistor;
a synchronous rectifier element connected at one end thereof to one end of the output transistor, and connected at another end thereof to a point from which the output voltage is outputted; and
a capacitor connected at one end thereof to the point from which the output voltage is outputted, and connected at another end thereof to a point to which a ground voltage is applied,
wherein the output portion produces the output voltage by stepping up the input voltage.

19. The electronic appliance of claim 10, wherein the load is a light-emitting diode or a light-emitting diode array.

* * * * *